Figure 1:
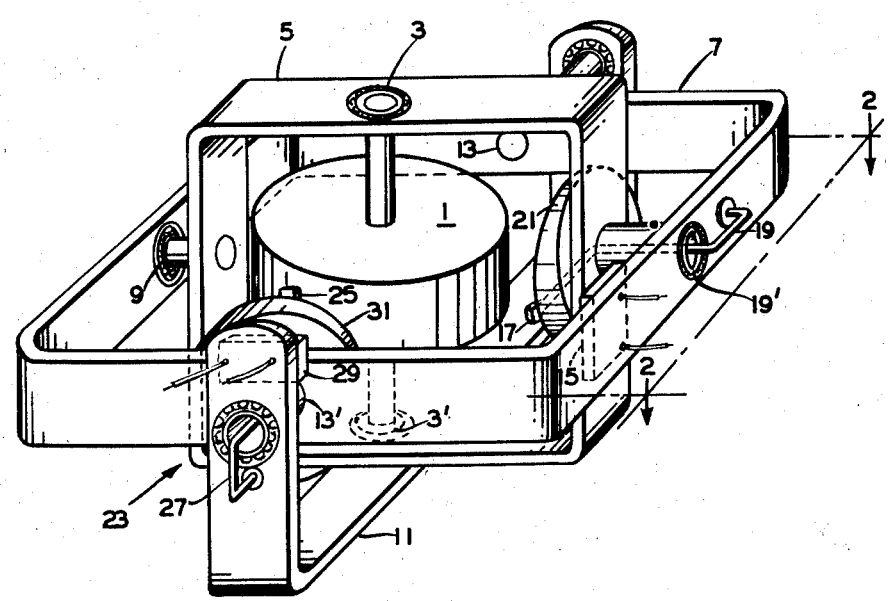

Oct. 21, 1958  M. V. KIEBERT, JR  2,856,778
SIGNAL GENERATOR
Filed Sept. 30, 1955

INVENTOR.
MARTIN V. KIEBERT
BY

ATTORNEY

2,856,778

SIGNAL GENERATOR

Martin V. Kiebert, Jr., Pomona, Calif., assignor to Bendix Aviation Corporation, Teterboro, N. J., a corporation of Delaware Application September 30, 1955, Serial No. 537,648

8 Claims. (Cl. 74—5.6)

The invention relates to pick offs or signal generators which provide signals in accordance with the relative positions of two relatively movable parts. While the novel pick off of the invention is especially suitable for use on gyroscopes and is shown and described in connection with a gyroscope, it should be understood that the pick off may be used for providing signals in any other arrangement in accordance with the relative positions of two relatively movable parts.

It is a well known fact that any friction in the gimbal bearings of a gyroscope results in undesirable precession torques. Signal generators of the kind used heretofore, such as potentiometers and synchros, often provide such undesirable friction forces. The sliding wiper on the potentiometer and the brushes on the slip rings of the synchro create friction forces that cause the gyro to precess. Synchros also provide the problem of balance and mechanical symmetry over a wide temperature range required in most equipment. This latter problem also relates to E type pick offs.

A photo-electric control system was developed which avoided the problems of friction, weight distribution and balance. However, this arrangement is not entirely satisfactory because of the sagging effect of the lamp filament and because the life of such a device is definitely limited and it fails abruptly when the filament burns out. Also, the photo-cell is an extremely high impedance device which requires difficult circuitry when used in atmospheres of high humidity or in regions of appreciable electromagnetic or electrostatic fields arising from other equipment.

One object of the present invention is to provide a pick off which is frictionless.

Another object is to provide a pick off which, when used on a gyro, does not unbalance the gyro upon wide changes in temperature.

Another object is to provide a pick off which has a low impedance output.

Still another object of the invention is to provide a pick off whose performance will not terminate abruptly in the manner described above.

The invention contemplates a pick off having a radioactive source, a detector responsive to the source, and a shield positioned between the radioactive source and the detector. The shield and the detector or source are arranged for relative movement and the shield is shaped so that the detector provides signals corresponding to the relative positions of the detector and shield.

The foregoing and other objects and advantages of the invention will appear more fully hereinafter from a consideration of the detailed description which follows, taken together with the accompanying drawing wherein one embodiment of the invention is illustrated. It is to be expressly understood, however, that the drawing is for the purposes of illustration and description only, and is not to be construed as defining the limits of the invention.

Figure 2:
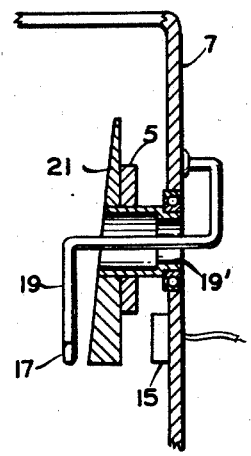

In the drawing,

Figure 1 is a perspective view of a gyroscope having pick offs constructed according to the invention; and Figure 2 is a detailed vertical section taken approximately on the line 2—2 of Fig. 1 showing the pick off in more detail.

Referring now to the drawing for a more detailed description of the novel pick off of the present invention; the pick off is shown as incorporated in a vertical gyro having a rotor 1 spinning about a vertical axis and rotatable in bearings 3, 3' within a rotor support or inner gimbal 5. Rotor support 5 is mounted for rotational movement relative to an intermediate gimbal 7 at right angles to the spin axis by means of bearings 9, 9' between the support and gimbal 7, and gimbal 7 is mounted for rotational movement by means of bearings 13, 13' within a frame or outer gimbal 11, rigidly supported by the craft in which the gyro is mounted. The axis of rotation of gimbal 7 relative to the frame is at right angles to the axis of rotation of rotor support 5 relative to gimbal 7 so that the gyro has three degrees of freedom relative to the craft. Bearings 9' and 13' are preferably hollow as shown for the reasons mentioned below.

The novel pick off of the invention comprises a detector 15 fixed to the inner face of gimbal 7 and a radioactive source 17 positioned adjacent detector 15 and mounted on a bracket 19 extending through hollow bearing 9' and rigidly supported on the outer face of gimbal 7. Detector 15 and radioactive source 17 preferably are arranged so that no relative movement occurs therebetween. The radioactive source may be a source of gamma or beta radiation, such as Cobalt-60, and the detector may be of any well known type for detecting such radiation, such as a Geiger tube or scintillation counter or germanium or similar type semi-conductor. It should be understood, however, that any other type radiation source and corresponding detector may be used.

A radiation absorption shield 21 of any suitable material such as lead or aluminum is fixedly mounted on rotor support 5 and is positioned between radiation source 17 and detector 15 and is arranged to move with rotor support 5 relative to radiation source 17 and detector 15. Shield 21 preferably is wedge-shaped, that is, it is thinner at one end than at the other end and gradually increases in thickness from the one end to the other so that as the shield moves between the radiation source and the detector, the shield absorbs radiation corresponding to its thickness so that a corresponding quantity of radiation strikes the detector and the detector provides a signal corresponding to the relative position of gimbal 7 and rotor support 5.

A second pick off 23 may be used for providing signals corresponding to the relative positions of gimbal 7 and frame 11 and comprises a radiation source 25 mounted on a bracket 27 extending through hollow bearing 13' and rigidly mounted on the outer face of frame 11. A detector 29 is fixed on frame 11 adjacent radiation source 25 and a wedge-shaped radiation absorption shield 31 is fixedly mounted on gimbal 7 to vary the radiation from radiation source 25 striking detector 29 in accordance with the relative position of gimbal 7 and frame 11. Suitable amplification of the signal from detectors 15 and 29 may be provided where required.

The pick offs described herein, while incorporated in a gyroscope, may be used for other purposes where a signal is required corresponding to the relative position of two relatively movable parts. The pick off described herein is friction free, causes no unbalance of the gimbals when used in a gyroscope, has a low impedance output and is not subject to abrupt termination of performance.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. In a gyroscope having a pair of gimbals mounted for movement relative to one another, a pick off for providing signals corresponding to the relative positions of said relatively movable gimbals, comprising a radioactive source and a detector responsive to said source and fixedly mounted on one of said gimbals, and a shield positioned between said source and said detector and fixedly mounted on the other of said gimbals, said shield being shaped so that said detector provides signals corresponding to the relative positions of said gimbals.

2. In a gyroscope having a pair of gimbals mounted for movement relative to one another, a pick off for providing signals corresponding to the relative positions of said relatively movable gimbals, comprising a radioactive source and a detector fixedly mounted on one of said gimbals, and a wedge-shaped shield positioned between said source and said detector and fixedly mounted on the other of said gimbals and shaped so that said detector provides signals corresponding to the relative positions of said gimbals.

3. In a gyroscope having a pair of gimbals mounted for movement relative to one another, a pick off for providing signals corresponding to the relative positions of said relatively movable gimbals, said gimbals having a hollow bearing therebetween for providing relative movement of said gimbals, a bracket fixedly mounted on one of said gimbals and extending through said hollow bearing, radioactive source means, detector means responsive to said source means, one of said means being mounted on said bracket and the other of said means being mounted on the said one gimbal so that said source means and said detector means are fixedly mounted relative to one another and to said one gimbal and a radiation absorption shield positioned between said source means and said detector means and mounted on the other of said gimbals, said shield being shaped and arranged so that said detector means provides signals corresponding to the relative positions of said gimbals.

4. A gyroscope having a pair of gimbals mounted for movement relative to one another, a radioactive source and a detector fixedly mounted on one of said gimbals, and a shield positioned between said source and said detector and fixedly mounted on the other of said gimbals, said shield being shaped so that said detector provides signals corresponding to the relative positions of said gimbals.

5. A gyroscope having a spinning rotor, a support mounting said rotor, a gimbal, a hollow bearing rotatably mounting said support on said gimbal, a bracket secured to said gimbal and extending through said hollow bearing, radioactive source means, detector means responsive to said source means, one of said means being mounted on said bracket and the other of said means being mounted on said gimbal, and a radiation absorption shield mounted on said rotor support and positioned between said source means and said detector means, said shield being shaped so that said detector provides signals corresponding to the relative positions of said support and gimbal.

6. A gyroscope having a spinning rotor, a support mounting said rotor, a first gimbal, a hollow bearing rotatably mounting said support on said gimbal, a second gimbal, a hollow bearing rotatably mounting said first gimbal on said second gimbal, brackets secured to said gimbals and extending through said hollow bearings, a radioactive source mounted on each of said brackets, a detector responsive to each of said sources and mounted on each of said gimbals, and radiation absorption shields mounted on said rotor support and said first gimbal and positioned between said sources and said detectors, said shields being shaped so that said detectors provide signals corresponding to the relative positions of said support and gimbals.

7. In a gyroscope including a pair of gimbals mounted for movement relative one to the other, and means for providing signals corresponding to the relative positions of said movable gimbals; said signal means comprising a radioactive source, a detector means responsive to radiation from said radioactive source, means to vary the radiation from said source to said detector means, and means operatively connecting said radiation varying means to said movable gimbals so that said detector means provides signals corresponding to the relative positions of said gimbals.

8. The combination defined by claim 7 in which the radiation varying means includes a variable radiation absorption device positioned between said radioactive source and said detector means, and the connecting means includes pivotal means connecting said gimbals and operatively connecting said radiation absorption device relative to said source and said detector means so as to vary the radiation to said detector means from said radioactive source with pivotal adjustment of said gimbals relative one to the other.

References Cited in the file of this patent

UNITED STATES PATENTS

| | | |
|---|---|---|
| 1,999,646 | Wittkuhns | Apr. 30, 1935 |
| 2,264,725 | Shoupp et al. | Dec. 2, 1941 |
| 2,467,812 | Clapp | Apr. 19, 1949 |
| 2,501,173 | Herzog | Mar. 21, 1950 |
| 2,589,874 | Seliger | Mar. 18, 1952 |
| 2,684,001 | Wilson | July 20, 1954 |
| 2,745,969 | Keller | May 15, 1956 |